3,351,681
NUCLEAR CHLORINATED α-HYDROXYBENZYL PHOSPHONIC ACIDS AND THE SALTS AND ESTERS OF SAID ACIDS
Adolph J. Deinet, Woodcliff Lake, N.J., assignor to Tenneco Chemicals, Inc., a corporation of Delaware
No Drawing. Filed Nov. 27, 1964, Ser. No. 414,464
8 Claims. (Cl. 260—953)

This invention relates to nuclear chlorinated α-hydroxybenzyl phosphonic acids and to certain derivatives of these acids. It further relates to the use of these compounds in the control or inhibition of plant growth.

In accordance with this invention it has been discovered that certain nuclear chlorinated α-hydroxybenzyl phosphonic acids and their salts and esters have unusual and valuable activity as selective herbicides. These compounds have the structure

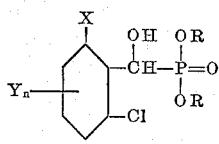

wherein X represents hydrogen or chlorine, Y represents hydrogen, chlorine, nitro, or amino, $n$ represents an integer in the range of zero to 2, and each R represents hydrogen, an alkali metal, an alkyl group having from 1 to 6 carbon atoms, or a hydroxyalkyl group having from 1 to 6 carbon atoms. The preferred compounds for use as selective herbicides are the lower alkyl esters of 2,3,6-trichloro-α-hydroxybenzyl phosphonic acid. Illustrative of the compounds of this invention are the following: o-chloro-α-hydroxybenzyl phosphonic acid, 2,4-dichloro-α-hydroxybenzyl phosphonic acid, 2,6-dichloro-α-hydroxybenzyl phosphonic acid, 2,3,6-trichloro-α-hydroxybenzyl phosphonic acid, 2,6-dichloro-3-nitro-α-hydroxybenzyl phosphonic acid, 2,6-dichloro-3-amino-α-hydroxybenzyl phosphonic acid, 2,3,5,6-tetrachloro-α-hydroxybenzyl phosphonic acid, 2,3,6-trichloro-5-nitro-α-hydroxybenzyl phosphonic acid, 2,3,6-trichloro-5-amino-α-hydroxybenzyl phosphonic acid; the methyl, ethyl, propyl, isopropyl, butyl, sec. butyl, tert. butyl, amyl, hexyl, hydroxymethyl, hydroxyethyl, hydroxybutyl, and hydroxyhexyl esters of said acids; and their sodium, potassium, and lithium salts.

The compounds of this invention may be prepared by any convenient procedure. For example, the alkyl esters may be prepared by the reaction of equimolar quantities of the appropriate substituted benzaldehyde with a dialkyl phosphite. Hydrolysis of these esters under acidic conditions yields the free acids.

The herbicidal compounds of this invention may be applied to a wide variety of plants to control or inhibit their growth. They are of particular value in the control of such weeds as wild mustard and bindweed in an area containing corn, wheat, oats, or another crop.

While these compounds may be applied as such to plants or to the soil, they are preferably used in combination with an inert carrier. They may be mixed with or deposited upon inert finely-divided solids and employed as dusts. Such mixtures may also be dispersed in water with or without the aid of a wetting agent and the resulting aqueous suspensions employed as sprays. Alternatively, these compounds may be used as the active herbicidal components in hydrocarbon solutions, in oil-in-water emulsions, or in aqueous dispersions.

The concentration of the chloro-α-hydroxybenzyl phosphonic acid or its derivative in the herbicidal composition may vary within wide limits and depends upon a number of factors, the most important of which are the amount of the composition to be applied per unit of area and the type or types of plants being treated. In most cases, the composition contains approximately 0.1 percent to 85 percent by weight of the herbicidal compound. The amount of the composition used is that which will provide the desired phytotoxic effect. Generally, it is used at a rate that will apply approximately 0.5 pound to 30 pounds and preferably 2 pounds to 10 pounds of the herbicidal compound per acre. Mixtures of two or more of the herbicidal compounds of this invention may be used. If desired, other herbicidal compounds may also be present in the herbicidal compositions.

The invention is further illustrated by the examples that follow. It is to be understood, however, that these examples are given solely for the purpose of illustration and that the invention is not limited to any of the specific materials or conditions mentioned therein except as set forth in the accompanying claims.

Example 1

A mixture of 208 grams (1 mole) of 2,3,6-trichlorobenzaldehyde, 138 grams (1 mole) of diethyl phosphite, and 10 grams of anhydrous sodium carbonate was heated to 100° C. After about 5 minutes at this temperature, an exothermic reaction began which caused the temperature to rise to 145° C. The reaction mixture was maintained at 145° C. for 45 minutes, filtered, and cooled to room temperature. There was obtained 330 grams of crystalline diethyl 2,3,6 - trichloro - α - hydroxybenzyl phosphonate which melted at 70°–80° C. and which contained 30.46% Cl (calculated for $C_{11}H_{14}O_4Cl_3P$, 30.2% Cl).

Example 2

A mixture of 208 grams (1 mole) of 2,3,6-trichlorobenzaldehyde, 194 grams (1 mole) of dibutyl phosphite, and 10 grams of anhydrous sodium carbonate was heated at 145° C. for 45 minutes, filtered, and cooled. The dibutyl 2,3,6-trichloro-α-hydroxybenzyl phosphonate obtained melted at 60°–65° C. and contained 26.3% Cl (calculated for $C_{15}H_{22}O_4Cl_3P$, 26.1% Cl).

Example 3

A mixture of 55.7 grams (0.319 mole) of 2,4-dichlorobenzaldehyde, 43.8 grams (0.319 mole) of diethyl phosphite, and 3 grams of triethylamine was heated at 145° C. for 45 minutes, filtered, and cooled to room temperature. There was obtained 98.5 grams of non-crystalline diethyl 2,4-dichloro-α-hydroxybenzyl phosphonate which contained 22.0% Cl (calculated for $C_{11}H_{15}O_4Cl_2P$, 22.6% Cl).

Example 4

A mixture of 1 part by weight of diethyl 2,3,6-trichloro-α-hydroxybenzyl phosphonate in 10 parts by weight of concentrated hydrochloric acid was heated at its reflux temperature for 11 hours. After filtration to remove tars, the solution was evaporated to dryness under reduced pressure. There was obtained a 56% yield of 2,3,6-trichloro-α-hydroxybenzyl phosphonic acid, a glossy material which crystallized on standing. It contained 32.1% Cl (calculated for $C_7H_6O_4Cl_3P$, 38.7% Cl).

Example 5

Groups of greenhouse flats containing soil were planted with seeds of various crop and weed species. In the preemergence tests, flats were sprayed after planting with a 0.3% aqueous solution of one of the compounds of this invention. In the post-emergence tests, the plants were sprayed with the same solutions 2 to 4 weeks after planting. In each case the solution was used at a rate that would apply 10 pounds of the herbicidal compound per acre. The results of these tests were observed 2 weeks after the application of the herbicidal composition. In Table I the effectiveness of the herbicidal compounds, as determined by comparison with untreated plantings, is indicated by the numbers "0" through "10" in increasing order of effectiveness. Thus "0" indicates no herbicidal activity; "1" to "3," slight injury; "4" to "6," moderate injury; "7" to "9," severe injury; and "10" destruction of all plants.

TABLE I

| Plant Species | Disodium 2,3,6-trichloro-α-hydroxybenzyl phosphonate | | Diethyl 2,3,6-trichloro-α-hydroxybenzyl phosphonate | | Dibutyl 2,3,5-trichloro-α-hydroxybenzyl phosphonate | |
|---|---|---|---|---|---|---|
| | Pre | Post | Pre | Post | Pre | Post |
| Corn | 5 | 0 | 0 | 0 | 0 | 0 |
| Wheat | 10 | 0 | 0 | 0 | 8 | 0 |
| Oats | 10 | 0 | 0 | 0 | 6 | 0 |
| Soybeans | 10 | 8 | 10 | 10 | 0 | 10 |
| Beets | 0 | 10 | 10 | 10 | 10 | 10 |
| Cucumber | 10 | 9 | 8 | 10 | 8 | 10 |
| Foxtail | 8 | 0 | 5 | 0 | 0 | 0 |
| Ryegrass | 0 | 0 | 0 | 0 | 0 | 0 |
| Timothy | 10 | 0 | 8 | 0 | 8 | 0 |
| Mustard | 0 | 5 | 10 | 10 | 10 | 8 |
| Buckwheat | 0 | 0 | 0 | 0 | 0 | 4 |
| Morning Glory | 0 | 0 | 10 | 10 | 10 | 6 |

*Example 6*

Groups of greenhouse flats containing soil were planted with seeds of various crop and weed species. Four weeks after planting, the plants were sprayed with a 0.3% solution of one of the compounds of this invention. In each case the solution was used at a rate that would apply 10 pounds of the herbicidal compound per acre. The results of these tests, which were observed 2 weeks after the application of the herbicidal composition, are given in Table II.

TABLE II

| Plant Species | Diethyl 2,4-dichloro-α-hydroxybenzyl phosphonate | Dibutyl 2,6-dichloro-3-nitro-α-hydroxybenzyl phosphonate | Diethyl 2,3,6-trichloro-5-nitro-α-hydroxybenzyl phosphonate |
|---|---|---|---|
| Sugar Beets | 8 | 0 | 0 |
| Clover | 7 | 2 | 5 |
| Wheat | 5 | 0 | 1 |
| Oats | 5 | 0 | 0 |
| Corn | 4 | 3 | 2 |
| Soybeans | 6 | 5 | 3 |
| Mustard | 9 | 4 | 4 |
| Barnyard Grass | 3 | 0 | 1 |
| Foxtail | 0 | 0 | 1 |
| Crabgrass | 2 | 0 | 1 |
| Buckwheat | 6 | 0 | 0 |
| Morning Glory | 10 | 5 | 0 |

I claim:
1. A compound having the structure

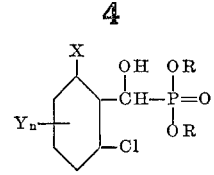

wherein X represents a member selected from the group consisting of hydrogen and chlorine, Y represents a member selected from the group consisting of hydrogen, chlorine, nitro, and amino, $n$ represents an integer in the range of zero to 2, and each R represents a member selected from the group consisting of hydrogen, an alkali metal, an alkyl group having from 1 to 6 carbon atoms, and a hydroxylalkyl group having from 1 to 6 carbon atoms.

2. 2,4-dichloro-α-hydroxybenzyl phosphonic acid.

3. Diethyl 2,4-dichloro-α-hydroxybenzyl phosphonate.

4. 2,3,6-trichloro-α-hydroxybenzyl phosphonic acid.

5. Diethyl 2,3,6 - trichloro-α-hydroxybenzyl phosphonate.

6. Dibutyl 2,3,6 - trichloro-α-hydroxybenzyl phosphonate.

7. Disodium 2,3,6-trichloro-α-hydroxybenzyl phosphonate.

8. Dibutyl 2,6-dichloro-3-nitro-α-hydroxybenzyl phosphonate.

References Cited

UNITED STATES PATENTS 2,579,810  12/1951  Fields _____ 260—953 X
3,223,514  12/1965  Gradsten _____ 260—500 X CHARLES B. PARKER, *Primary Examiner.*

A. H. SUTTO, *Assistant Examiner.*